United States Patent [19]
Freytag et al.

[11] 3,940,501
[45] Feb. 24, 1976

[54] FONTINA CHEESE FLAVOR
[75] Inventors: Wolfram Gustav Freytag, Halstenbek; Karl Heinz Ney, Hamburg; I. Poetoe Gde Wirotama, Rellingen, all of Germany
[73] Assignee: Lever Brothers Company, New York, N.Y.
[22] Filed: July 12, 1974
[21] Appl. No.: 488,124

[30] Foreign Application Priority Data
July 17, 1973   Luxemburg............................ 68032

[52] U.S. Cl. ................ 426/535; 426/537; 426/538; 426/534
[51] Int. Cl.² ......................................... A23L 1/226
[58] Field of Search ....................... 426/65, 534–538

[56] References Cited
FOREIGN PATENTS OR APPLICATIONS
7,204,792   10/1972   Netherlands

OTHER PUBLICATIONS

*Chemical Abstracts*, Vol. 77, 1972, 99731p.

*Chemicals Used in Food Processing* Publication 1274, National Academy of Science, Washington, D. C., 1965, pp. 179–180.

*Primary Examiner*—Joseph M. Golian

[57]   ABSTRACT

A Fontina-cheese flavor is given to a foodstuff by the addition of a flavor composition comprising β-phenyl propionic acid and non-terminal mono-methyl substituted alkanoic acids having 4 to 6 carbon atoms. Addition of the flavor composition is particularly useful when the foodstuff is a cheese-product which is prepared from young Cheddar cheese.

7 Claims, No Drawings

FONTINA CHEESE FLAVOR

BACKGROUND OF THE INVENTION

1. Field of the Invention

The invention relates to a process for imparting to, or enhancing in, a foodstuff a Fontina-cheese flavor. The invention also relates to cheese flavor compositions suitable to be used in such a process.

2. Description of Prior Art

According to the invention, by "Fontina"-cheese should be understood the firm cheese originating from Italy, mainly from the Aosta valley, which is exclusively prepared from cow's milk. This cheese has a straw-yellow, elastic dough with only few holes. Its taste is characteristically sweet.

Up to now it has not yet been possible to impart to foodstuffs a Fontina-flavor, i.e. smell and taste, without the addition of Fontina cheese. In the literature nothing has been disclosed so far about Fontina-cheese flavor compositions. A few publications deal with the fatty acid composition of Fontina-cheese (cf. *Atti Della Societa Italiana Delle Scienze Veterinarie*, Vol. XXIV, 1970, pp. 372–379, and *Dairy Science Abstracts*, Vol. 27, No. 2, pp. 86–87, Abstr. 610).

While the first-mentioned work reports only in general on the occurrence of the various fatty acids in Fontina, the last-mentioned prior publication already indicates that acetic acid and isovaleric acid are among the main constituents of the free fatty acids in Fontina cheese. This knowledge, however, did not make it possible to prepare a flavoring composition which is suitable for imparting a Fontina-cheese flavor, after incorporation into foodstuffs.

It has now surprisingly been found that the typical Fontina-cheese flavor is essentially obtained by the addition of a flavoring composition comprising effective amounts of β-phenylpropionic acid and alkanoic acids, having one side chain consisting of a methyl group, throughout this specification and the appended claims indicated as "non-terminal mono-methyl-substituted alkanoic acids", having 4 to 6 carbon atoms, said substituted alkanoic acids comprising at least 50%, preferably 55 to 70%, of iso-valeric acid.

Other taste activating flavor components can additionally be incorporated in the foodstuffs, but only in such amounts that they cannot dominate the taste. Thus it was found that the Fontina-cheese flavor of a foodstuff can be rounded off by the additional incorporation of flavor additives known for cheeses, such as fatty acids other than the above defined, alcohols, aldehydes, alkanones, esters, diacetyl, methional, indole and amino acids.

Up to now, β-phenylpropionic acid has remained unknown in connection with Fontina-cheese. However, the use of β-phenylpropionic acid to impart to foodstuffs another kind of flavor, viz. a Cheddar cheese flavor is known. For instance in *Chemicals Used in Food Processing*, Publication 1274 of the National Academy of Sciences — National Research Council, Washington D.C. (1965), pages 179 and 180, β-phenylpropionic acid is mentioned as suitable for use in a cheese flavor without specifying the kind of cheese-flavor. According to this publication it can also be incorporated in foodstuffs other than cheese.

According to the Dutch patent application No. 7204792 (page 11) β-phenylpropionic acid, iso-butyric acid and iso-valeric acid are used as components of a cheddar-cheese flavor to round off said flavor.

SUMMARY OF THE INVENTION

The invention therefore provides a process for imparting or enhancing a Fontina-cheese flavor to a foodstuff comprising adding to the foodstuff an effective amount of a cheese-flavor composition comprising β-phenylpropionic acid and non-terminal mono-methyl-substituted alkanoic acids having 4 to 6 carbon atoms, said substituted alkanoic acids comprising at least 50% by weight of iso-valeric acid.

The process of the invention is useful to impart to foodstuffs, preferably cheese products, in particular processed cheese or similar cheeses, which have been prepared from young, relatively tasteless raw cheese, e.g. young Cheddar cheese, the flavor, viz. smell and taste of Fontina-cheese. The process is preferably carried out by adding such amounts of β-phenylpropionic acid and non-terminal mono-methyl-substituted alkanoic acids having 4 to 6 carbon atoms to the foodstuff as to give 10 to 100 mg/kg, more preferably 40 to 80 mg/kg and still more preferably 50 to 70 mg/kg, β-phenylpropionic acid and 20 to 30 mg/kg, more preferably 80 to 240 mg/kg and still more preferably 100–150 mg/kg, non-terminal mono-methyl-substituted alkanoic acids in the flavored foodstuff.

The invention also provides a process for preparing a Fontina-cheese flavor composition comprising admixing β-phenylpropionic acid and non-terminal mono-methyl-substituted alkanoic acids having 4 to 6 carbon atoms, said substituted alkanoic acids comprising at least 50% by weight, preferably 55 to 70% by weight of iso-valeric acid and optionally other known cheese flavor ingredients.

The cheese-flavor compositions according to the invention and to be used in the process thereof are synthetic compositions, i.e. the compositions are obtained by other means than by some treatment of some cheese in which the components of the composition according to the invention may happen to occur. The cheese-flavor compositions are preferably prepared by admixing the required components.

β-phenylpropionic acid and the non-terminal mono-methyl-substituted alkanoic acids having 4 to 6 carbon atoms are components which can be prepared by methods well-known to the skilled chemist.

Suitable non-terminal mono-methyl-substituted alkanoic acids are methyl propanoic acid (iso-butyric acid), 2-methylbutanoic acid, 3-methylbutanoic acid (iso-valeric acid), 2-methylvaleric acid, 3-methylvaleric acid and 4-methylvaleric acid (iso-caproic acid).

The ratio of β-phenylpropionic acid to non-terminal mono-methyl-substituted alkanoic acids having 4 to 6 carbon atoms is in general 1 : (0.2–30). Thus, for the flavoring of foodstuffs according to the invention, flavor compositions are used which contain 10 to 100 parts, preferably 40 to 80 parts of β-phenylpropionic acid and 20 to 300 parts, preferably 80 to 240 parts of non-terminal mono-methyl-substituted alkanoic acids having 4 to 6 carbon atoms, the proportion of the iso-valeric acid being at least 50%, preferably 55 to 70%, calculated on the total amount of the non-terminal mono-methyl-substituted alkanoic acids.

Preferably the amount of the non-terminal mono-methyl-substituted alkanoic acids is such that the concentration of the iso-valeric acid in the finished food-product is at least 40 mg/kg.

If such flavoring compositions are incorporated into the foodstuffs in the ranges mentioned, suitably below 80°C, foodstuffs are obtained with a clear Fontina taste.

According to a further embodiment of the invention the Fontina-flavor of the foodstuffs as well as the Fontina-flavor composition can be improved by adding other known cheese flavor constituents. In this process one should take good care that these additional flavor constituents do not dominate the taste, i.e. they should not be present in the foodstuffs beyond the limits indicated. The lower limit in each case indicates the value at which the action of the corresponding additive is perceptible.

On flavoring with Fontina flavor it has appeared to be advantageous to incorporate additionally into the foodstuffs about 600 mg/kg, suitably 40 to 450 mg/kg, preferably 250 to 350 mg/kg of straight-chain alkanoic acids having 2 to 8 carbon atoms, the amount of such fatty acids added comprising at least 20%, preferably 25 to 40% butyric acid, and supplemented up to 100%, possibly other straight-chain alkanoic acids, for example acetic acid, propionic acid, valeric acid, hexanoic acid, heptanoic acid an octanoic acid. In a preferred embodiment all the acids mentioned are used.

A further improvement of the Fontina flavor can be achieved by incorporating into the foodstuffs up to about 15 mg/kg, preferably not more than 8 mg/kg of a mixture of primary alcohols and secondary 2-alkanols having 3 to 9 carbon atoms, although an amount of 2 mg/kg is already active. As examples of these substances propanol-1, propanol-2, n-butanol-1, butanol-2, n-hexanol-1, n-heptanol-2, n-octanol-1, n-octanol-2, n-nonanol-1 and n-nonanol-2 can be mentioned.

It has also proved advantageous to add aldehydes having 2 to 5 carbon atoms in an amount of up to about 20 mg/kg, preferably 5 mg/kg, 1 mg/kg already being active. Suitable aldehydes having 2 to 5 carbon atoms are for example ethanol, propanal, butanal, pentanal, 2-methylpropanal, 2-methylbutanal and 3-methylbutanal.

The cheese flavor constituents which can be used in the present process also include the 2-alkanones having 5 to 9 carbon atoms, in the presence of which also an advantageous rounding of the taste in the foodstuff could be ascertained, provided that not more than 8 mg/kg, preferably not more than 4 mg/kg of the 2-alkanones are added, 0.5 mg/kg already being an effective amount. E.g. 2-pentanone, 2-heptanone and 2-nonanone have proved to be suitable 2-alkanones.

Also the ethyl esters of the straight-chain alkanoic acids with 4 to 8 carbon atoms were successfully used in the flavoring process; their content in the foodstuff should not exceed 4 mg/kg, preferably 2 mg/kg. The smallest active amount is 0.3 mg/kg. Suitable ethyl esters are the ethyl esters of butyric acid, pentanoic acid, hexanoic acid, heptanoic acid and octanoic acid.

The Fontina flavor of the foodstuffs prepared by the present process can be rounded off with further known flavor constituents. These include diacetyl, methional and indole. Of these substances not more than 20 mg/kg, preferably not more than 10 mg/kg should be added to the foodstuffs.

Fontina cheese flavor compositions according to the invention may contain 10 to 100 parts, preferably 40 to 80 parts of β-phenylpropionic acid, 20 to 300 parts, preferably 80 to 240 parts of non-terminal mono-methyl-substituted alkanoic acids having 4 to 6 carbon atoms, the branched acids consisting for at least 50 wt.%, preferably 50 to 70 wt.%, of iso-valeric acid; 40 to 600 parts, preferably 250 to 350 parts of straight-chain alkanoic acids having 2 to 8 carbon atoms, the straight-chain acids consisting for at least 20 wt.% of butyric acid; 2 to 15 parts, preferably not more than 8 parts of 1-alkanols and 2-alkanols having 3 to 9 carbon atoms; 1 to 20 parts, preferably not more than 5 parts of alkanals having 2 to 5 carbon atoms; 0.5 to 8 parts, preferably not more than 4 parts of 2-alkanones having 5 to 9 carbon atoms; 0.3 to 4 parts, preferably not more than 2 parts of ethyl esters of the straight-chain alkanoic acids having 4 to 8 carbon atoms; and 0.1 to 20 parts, preferably not more than 10 parts of diacetyl, menthionine and indole.

Amounts in the range of about 100 to 1000 mg/kg, calculated on the foodstuff, have proved to be effective amounts of the Fontina-cheese flavoring compositions according to the invention.

The Fontina-taste of the foodstuff can be further strengthened by additionally incorporating into the foodstuffs a mixture of amino acids, which then applies to each of the flavoring steps described above. It was found that an effective mixture contains L-glutamic acid, glycine, L-lysine and DL-methionine.

Preferably such a mixture contains not more than 10% of amino acids other than L-glutamic acid, glycine, L-lysine and DL-methionine. Instead of the amino acids their salts can be used. Preferably L-glutamic acid is used in the form of its monosodium salt and L-lysine in the form of the hydrochloride. The composition of such an amino acid mixture can vary over a wide range. Preferred mixtures comprise about 40 to 60% of sodium glutamate, 5 to 25% of glycine, 10 to 40% of L-lysine HCl and 5 to 20% of DL-methionine.

In order to strengthen the Fontina taste, in the process of the present invention the amino acid mixture is incorporated into the foodstuffs in an amount of 1000 to 10,000 mg/kg, preferably 3000 to 6000 mg/kg.

It is preferred that the amount of the amino acids added should be such that in the final food product at least one, preferably at least three of the constituents glutamic acid, glycine, lysine and methionine are present in a concentration which is at least twice that of any free amino acid other than glutamic acid, glycine, lysine and methionine that is present in the foodstuff.

The amino acid mixture described above is advantageously used in such a composition and amount that in the final food product the concentration of L-glutamic acid or its monosodium salt and/or that of the L-lysine or the corresponding hydrochloride is at least double the concentration of any free amino acid other than glutamic acid, glycine, lysine and methionine that is present in the foodstuff.

Smaller amounts of amino acids are used if the foodstuff already contains an appreciable amount of amino acids, e.g. if an about 6 month-old Cheddar cheese is used as starting material for the preparation of a processed cheese with Fontina cheese flavor. Preferably, for obtaining a product having an intense and rounded Fontina flavor a Fontina cheese flavor composition as well as a mixture of amino acids are incorporated into the foodstuffs.

The foodstuffs to which a Fontina cheese flavor is imparted according to the invention by incorporation of the present flavoring compositions, include first of all cheese products, particularly cheese products prepared from young, relative tasteless raw cheeses, preferably young Cheddar cheese, for example processed cheese, cheese or processed cheese preparations, fresh cheese, margarine cheese, creamed cheeses, cheese fondu, cheese powder and the like. However, a Fontina flavor can also be imparted according to the process of the invention to other foodstuffs in which a cheese flavor is advantageous, e.g. soups, sauces, pies, sandwich spreads, cheese pastries, pizza and similar foodstuffs.

The process according to the invention is preferably intended to flavor cheese products which wholly or partly consists of unripened or not fully ripened cheese.

In the present specification percentages and parts are by weight, unless otherwise indicated.

The present invention will now be illustrated by the following Examples, without being limited thereto.

EXAMPLE I

From 1 kg about 6 week-old Cheddar cheese, 600 ml water and 30 g commercial melting salt, consisting of polyphosphates, a processed cheese was prepared with heating at about 80°C. To the melt, while still hot, 40 mg of β-phenylpropionic acid, and 100 mg of a fat mixture consisting of 40% iso-butyric acid, 50% iso-valeric acid and 10% iso-caproic acid, were added with stirring. A processed cheese was obtained with a flavor of Fontina cheese, containing 24 mg/kg of β-phenylpropionic acid and 61 mg/kg of the above-mentioned mixture of non-terminal mono-methyl-substituted alkanoic acids.

EXAMPLE II

The process of Example I was repeated, except that additionally 400 mg of the following fatty acid mixture were added with stirring:

| | |
|---|---|
| acetic acid | 90.0 parts |
| propionic acid | 110.0 parts |
| n-butyric acid | 75.4 parts |
| n-valeric acid | 7.5 parts |
| n-caproic acid | 44.4 parts |
| n-caprylic acid | 31.0 parts |

A processed cheese was obtained which additionally contained 306 mg/kg of the aforementioned mixture of straight-chain alkanoic acids and showed a stronger Fontina cheese flavor than the processed cheese prepared according to Example I.

EXAMPLE III

A Fontina cheese flavor composition was prepared by mixing of the following constituents:

| | parts by weight |
|---|---|
| beta-phenylpropionic acid | 60.0 |
| iso-butyric acid | 41.0 |
| iso-valeric acid | 104.0 |
| 2-methyl-valeric acid | 3.7 |
| iso-caproic acid | 26.2 |
| acetic acid | 90.0 |
| propionic acid | 72.3 |
| butyric acid | 75.4 |
| valeric acid | 7.5 |
| caproic acid | 44.4 |
| caprylic acid | 31.0 |
| propanol-1 | 0.4 |
| propanol-2 | 0.2 |
| n-butanol-1 | 0.5 |
| butanol-2 | 0.1 |
| n-hexanol-1 | 0.2 |
| n-hexanol-2 | 0.5 |
| n-octanol-1 | 0.4 |
| n-octanol-2 | 0.6 |
| n-nonanol-1 | 0.3 |

-continued

| | parts by weight |
|---|---|
| n-nonanol-2 | 0.1 |
| acetaldehyde | 3.3 |
| propionaldehyde | 2.1 |
| n-butyraldehyde | 2.0 |
| n-valeraldehyde | 0.7 |
| pentanone-2 | 0.4 |
| heptanone-2 | 0.2 |
| nonanone-2 | 0.8 |
| ethyl-n-butanoate | 0.2 |
| ethyl-n-hexanoate | 0.4 |
| ethyl-n-octanoate | 0.5 |
| diacetyl | 1.5 |
| methional | 0.2 |
| indole | 1.2 |

EXAMPLE IV

The procedure of Example I was repeated, except that in the melt, while still hot, 572 mg of a Fontina flavor composition according to Example III were added. A processed cheese was obtained having an intense and characteristic Fontina taste, the final product containing 350 mg/kg of the flavoring composition.

EXAMPLE V

The procedure of Example IV was repeated, except that additionally 3000 mg of an amino acid mixture consisting of 1170 parts of monosodium-L-glutamate, 630 parts of glycine, 300 parts of DL-methionine and 900 parts of L-lysine-HCl were added. A processed cheese was obtained having an intense and fully rounded Fontina taste.

What is claimed is:

1. A process for imparting or enhancing a fontina cheese flavor to a foodstuff selected from the group consisting of processed cheese, processed cheese preparations, fresh cheese margarine cheese, creamed cheese, cheese fondu, and cheese powder, which comprises:

A. preparing a fontina cheese flavoring composition by admixing i. from 10 to 100 parts by weight of β-phenylpropionic acid;

ii. from 20 to 300 parts by weight of non-terminal mono-methyl-substituted alkanoic acids having 4 to 6 carbon atoms, said substituted alkanoic acids comprising at least 50 percent by weight of iso-valeric acid;

iii. from 0 to 600 parts by weight of straight chain alkanoic acids having from 2 to 8 carbon atoms, consisting of at least 20 percent by weight of butynic acid;

iv. from 0 to 15 parts by weight of 1-alkanols and 2-alkanols having from 3 to 9 carbon atoms;

v. from 0 to 20 parts by weight of alkanals having from 2 to 5 carbon atoms;

vi. from 0 to 8 parts by weight of 2-alkanones having from 5 to 9 carbon atoms;

vii. from 0 to 4 parts by weight of ethyl esters of straight chain alkanoic acids having from 4 to 8 carbon atoms; and viii. from 0 to 20 parts by weight of other cheese flavoring ingredients selected from the group consisting of diacetyl, methional and indole; and B. admixing the mixture obtained by step (A) with said foodstuff in an amount such as to give from 10 to 100 mg/kg of β-phenylpropionic acid and from 20 to 300 mg/kg of the non-terminal mono-substituted alkanoic acids in the flavored foodstuff.

2. Process according to claim 1, in which the amounts of β-phenylpropionic acid and of non-terminal mono-methyl-substituted alkanoic acids having 4 to 6 carbon atoms are such as to give 40 to 80 mg/kg of β-phenylpropionic acid and 80 to 240 mg/kg of the non-terminal mono-methyl-substituted alkanoic acids in the flavored foodstuff.

3. Process according to claim 1, in which the ratio by weight of β-phenylpropionic acid to non-terminal mono-methyl-substituted alkanoic acids having 4 to 6 carbon atoms in the flavor composition is in the range of 1:0.2 to 1:30.

4. Process according to claim 1, in which the non-terminal mono-methyl-substituted alkanoic acids having 4 to 6 carbon atoms comprise 55 to 70% by weight of iso-valeric acid.

5. A process according to claim 1, in which additionally a mixture of amino acids, consisting of rom 40 to 60 percent by weight of sodium l-glutamate, from 5 to 25 percent by weight of glycine, from 10 to 40 percent by weight of L-lysine.HCl, from 5 to 20 percent by weight of DL-methionine, and from 0 to 10 percent by weight of other amino acids, is admixed with the foodstuff in an amount of from 1000 to 10,000 mg of amino acids per kg of said foodstuff.

6. A fontina cheese flavoring composition prepared by admixing:
   i. from 10 to 100 parts by weight of β-phenylpropionic acid;
   ii. from 20 to 300 parts by weight of non-terminal mono-methyl-substituted alkanoic acids having 4 to 6 carbon atoms, said substituted alkanoic acids comprising at least 50 percent by weight of iso-valeric acid;
   iii. from 0 to 600 parts by weight of straight chain alkanoic acids having from 2 to 8 carbon atoms, consisting of at least 20 percent by weight of butynic acids;
   iv. from 0 to 15 parts by weight of 1-alkanols and 2-alkanols having from 3 to 9 carbon atoms;
   v. from 0 to 20 parts by weight of alkanols having from 2 to 5 carbon atoms;
   vi. from 0 to 8 parts by weight of 2-alkanones having from 5 to 9 carbon atoms;
   vii. from 0 to 4 parts by weight of ethyl esters of straight chain alkanoic acids having from 4 to 8 carbon atoms; and,
   viii. from 0 to 200 parts by weight of other cheese flavoring ingredients selected from the group consisting of diacetyl, methional and indole.

7. A foodstuff according to claim 6 containing additionally glutamic acid, glycine, lysine and methionine in relative proportions of (35–52):(5–25):(8–32):(5–20) and whereby each of at least three of these amino acids is present in a concentration which is at least twice as large as that of each amino acid present in the foodstuff other than glutamic acid, glycine, lysine and methioana.

* * * * *